(12) United States Patent  (10) Patent No.: US 7,891,324 B2
Franklin et al.  (45) Date of Patent: Feb. 22, 2011

(54) METHOD AND APPARATUS FOR HEATING A CIRCULATING FLUID IN AN INDIRECT HEAT EXCHANGER

(76) Inventors: David A. Franklin, 1618 Crescent Point Dr., Katy, TX (US) 77494; Martin J. Rosetta, 2325 Bending Spring Dr., Pearland, TX (US) 77584

( * ) Notice: Subject to any disclaimer, the term of this patent is extended or adjusted under 35 U.S.C. 154(b) by 706 days.

(21) Appl. No.: 11/810,532

(22) Filed: Jun. 6, 2007

(65) Prior Publication Data

US 2008/0302519 A1  Dec. 11, 2008

(51) Int. Cl.
*F22B 1/02* (2006.01)
(52) U.S. Cl. .................. 122/31.1; 122/33; 62/50.2; 423/239.1
(58) Field of Classification Search .......... 122/31.1, 122/33, 36, 7 R; 423/239.1, 235; 62/50.2
See application file for complete search history.

(56) References Cited

U.S. PATENT DOCUMENTS

| | | | |
|---|---|---|---|
| 2,543,743 A | | 2/1951 | Evans |
| 4,025,426 A | | 5/1977 | Anderson |
| 4,170,115 A | | 10/1979 | Ooka et al. |
| 4,340,572 A | | 7/1982 | Ben-Shmuel |
| 4,719,094 A | * | 1/1988 | Rieckert et al. .......... 423/239.1 |
| 4,730,577 A | * | 3/1988 | Houghton ................ 122/33 |
| 4,981,660 A | * | 1/1991 | Leach .................... 423/235 |
| 5,507,921 A | * | 4/1996 | Best ...................... 203/41 |
| 5,567,394 A | * | 10/1996 | Chu et al. ................ 422/177 |
| 5,716,587 A | | 2/1998 | Khanmamedov |
| 6,403,854 B1 | | 6/2002 | Miller et al. |
| 6,979,430 B2 | * | 12/2005 | Fan et al. ................ 423/239.1 |
| 7,332,143 B2 | * | 2/2008 | Symrniotis et al. ....... 423/239.1 |
| 7,392,767 B2 | | 7/2008 | Franklin et al. |
| 7,458,340 B2 | * | 12/2008 | Takeda et al. ............. 122/31.1 |
| 7,498,009 B2 | * | 3/2009 | Leach et al. .............. 423/235 |
| 2006/0053775 A1 | * | 3/2006 | Powell et al. ............ 60/286 |
| 2006/0199983 A1 | | 9/2006 | Kammerhofer |
| 2006/0260330 A1 | | 11/2006 | Rosetta et al. |
| 2008/0196588 A1 | * | 8/2008 | Gretta et al. ............. 95/251 |

FOREIGN PATENT DOCUMENTS

JP  2002039695 A2  2/2002

OTHER PUBLICATIONS

U.S. Appl. No. 11/133,762, filed May 19, 2005, Martin J. Rosetta et al.

* cited by examiner

*Primary Examiner*—Gregory A Wilson
(74) *Attorney, Agent, or Firm*—F. Lindsey Scott

(57) ABSTRACT

A heater and a method for heating a circulating liquid in a gas-to-liquid heat exchanger and an indirect heat exchanger to produce a hot liquid stream for use for heat exchange in a selected process to supply heat to the process. One particularly useful application of the present invention is the revaporization of liquefied natural gas (LNG).

13 Claims, 5 Drawing Sheets

METHOD AND APPARATUS FOR HEATING A CIRCULATING FLUID IN AN INDIRECT HEAT EXCHANGER

FIELD OF THE INVENTION

The present invention relates to a quench column heater and a method for heating a circulating liquid to produce a hot liquid stream for use for heat exchange in a selected process to supply heat to the process. One particularly useful application of the present invention is the revaporization of liquefied natural gas (LNG).

BACKGROUND OF THE INVENTION

In many industrialized processes, heat is required at a temperature which is readily supplied by a circulating liquid, such as water. Such circulating streams require heating at a heat source to reheat the circulating liquid stream after it has given up heat in the area in which the heat was desired.

As indicated previously, one area wherein frequent applications of this type arise is in the revaporization of LNG.

In many remote areas of the world large natural gas deposits are found. These natural gas deposits, while constituting a valuable resource, have little value in the remote areas in which they are located. To utilize these resources effectively the natural gas must be moved to a commercial market area. This is frequently accomplished by liquefying the natural gas to produce LNG, which is then transported by ship or the like to a market place. Once the LNG arrives at the market place, the LNG must be revaporized for use as a fuel, for delivery to pipelines and the like. Other cryogenic fluids frequently require revaporization after transportation also, but by far the largest demand for processes of this type is for cryogenic natural gas revaporization.

The revaporization of the cryogenic natural gas requires the input of substantial quantities of heat. While seawater has been used in areas where seawater is readily available, certain disadvantages attend the use of seawater, not the least of which is lack of availability in some areas in which the LNG is to be revaporized. Other disadvantages relate to the corrosion of heat exchange surfaces by the seawater and the like.

In some instances, air has been used as a heat exchange medium to revaporize the cryogenic natural gas. One such process is shown in U.S. Ser. No. 11/133,762 entitled "Air Vaporizer" filed May 19, 2005 by Martin J. Rosetta, et al. This application is hereby incorporated in its entirety by reference. Other systems may also be used for the revaporization of the cryogenic liquid and include indirect heat exchangers such as shell and tube heat exchangers, direct fired heat exchangers in indirect heat exchange contact with the cryogenic gas and the like. In all such cases, substantial heat is required to revaporize the cryogenic natural gas.

In the air vaporization processes particularly, it would be desirable if a recirculating liquid stream could be used to heat the air prior to or during its passage through the revaporization vessels. Further it is desirable to heat the vaporized gas with a warm or hot liquid solution to raise it to a pipeline temperature after vaporization.

A continuing effort has been directed to the development of efficient equipment to provide a heated hot liquid stream in a recirculating loop for use in such processes.

SUMMARY OF THE INVENTION

The invention comprises a heater having a liquid inlet, a hot liquid outlet, a hot gas inlet and a cooled gas outlet and adapted to heat a liquid stream by heat exchange with a hot gas stream to produce a hot liquid stream and a cooled gas stream; the heater consists essentially of: a radiant/convection heat transfer first section, a first section liquid inlet, a first section liquid outlet, a first section gas inlet and a first section gas outlet adapted to cool a hot gas stream by heat exchange with a liquid stream to a temperature to produce a hot liquid stream at the first section liquid outlet and a gas stream at the first section gas outlet at a temperature suitable for passage through a selective catalytic reduction unit; a selective catalytic reduction unit having a reduction unit inlet in fluid communication with the first section gas outlet adapted to pass a reduced temperature gas stream to a reduction unit gas outlet; a convection heat transfer second section adapted to cool a hot gas by heat exchange with a liquid having a second section liquid inlet, a second section liquid outlet in fluid communication with the first section liquid inlet, a second section gas inlet in fluid communication with the reduction unit gas outlet; and, a waste heat recovery third section having a third section liquid inlet, a third section liquid outlet in fluid communication with the second section inlet, a third section gas inlet in fluid communication with the second section gas outlet and a third section gas outlet.

The invention also includes a method for producing a hot liquid stream and a cool reduced nitrogen oxide content gas stream from a hot nitrogen oxide-containing gas stream and a cool liquid stream, the method consisting essentially of: passing the hot nitrogen oxide-containing gas stream in heat exchange contact with a heated liquid stream to produce the hot liquid stream and a reduced temperature nitrogen oxide-containing gas at a temperature suitable for treatment in a selective nitrogen oxide catalytic reduction unit; passing the reduced temperature nitrogen oxide-containing gas through the selective nitrogen oxide catalytic reduction unit to produce a reduced nitrogen oxide-containing reduced temperature gas stream; passing the reduced nitrogen oxide containing reduced temperature gas in heat exchange contact with a warm liquid stream to produce the heated liquid stream and a further reduced temperature reduced nitrogen oxide gas; and, passing the further reduced temperature reduced nitrogen oxide gas in heat exchange with a cool liquid stream to produce the warm liquid stream and the cool reduced nitrogen oxide-containing stream.

DESCRIPTION OF PREFERRED EMBODIMENTS

In the discussion of the Figures, the same terms will be used throughout to refer to the same or similar components in FIG. 1 through FIG. 6.

Figure 1:
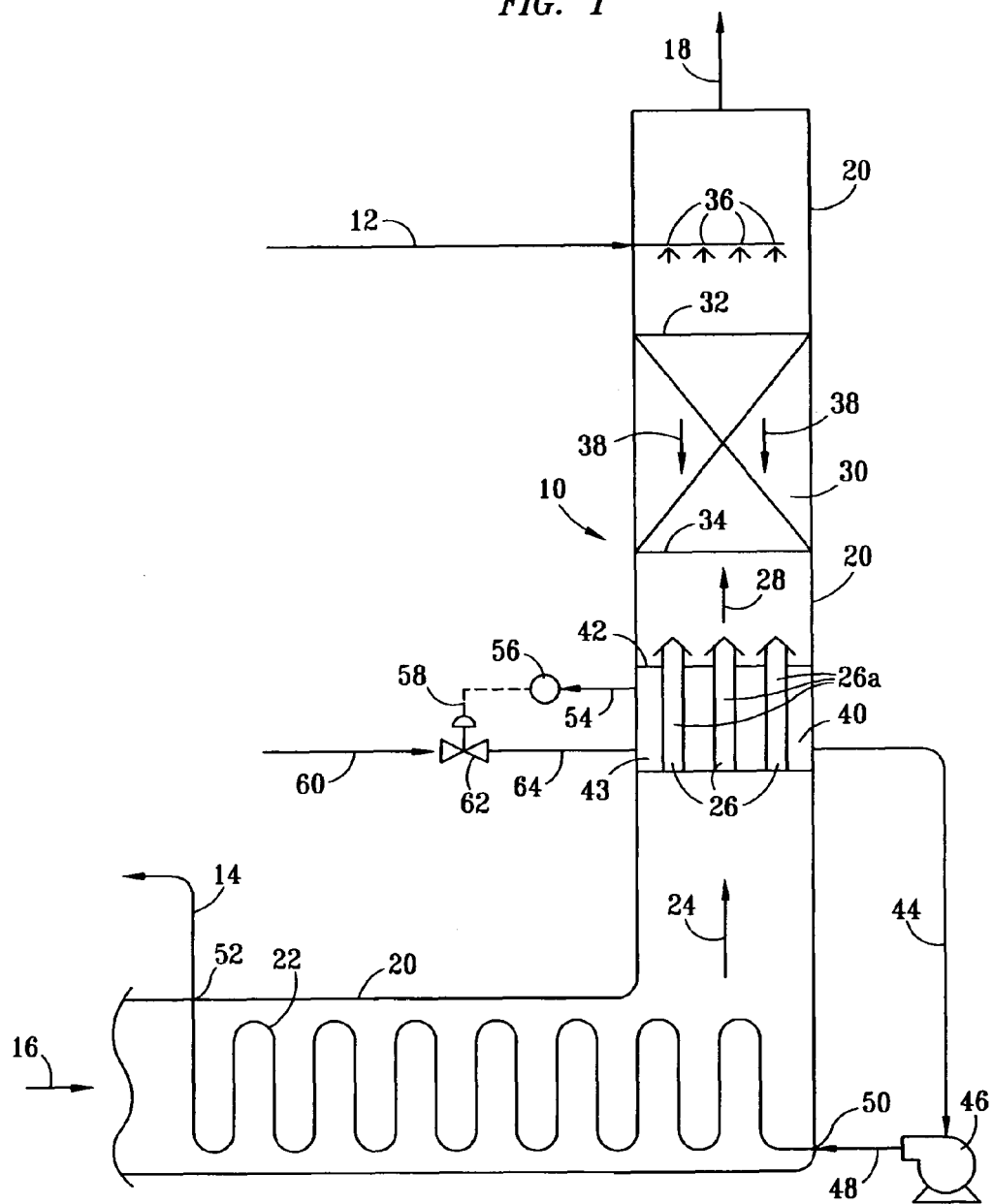
FIG. 1 is a schematic diagram of an embodiment of apparatus of the present invention.

In FIG. 1 a quench column heater 10 is shown. Heater 10 comprises a circulating liquid inlet 12, a heated circulating liquid outlet 14, a hot gas inlet 16 and a cooled exhaust gas outlet 18. A vessel 20 contains a heat exchanger tube 22 in which an intermediate temperature liquid is passed via a line 44, a pump 46 and a line 48 to an inlet 50 to a heat exchanger tube 22 for heat exchange with hot gas passed to heat exchanger tube 22 via an inlet as shown by arrow 22a. A hot liquid stream is recovered through a heat exchanger outlet 52 via a line 14. The resulting cooled exhaust gas is at an intermediate temperature and is recovered as shown by an arrow 24 and passed upwardly in vessel 20 through chimney tray inlets to chimney trap 26a) or other suitable equipment to pass the intermediate temperature gas through a liquid 40 having a liquid level 42 in a liquid collection zone 43 without direct liquid contact with the intermediate temperature gas. The intermediate temperature gas is passed upwardly as shown by arrow 28 into a quench packing column 30 through a bottom 34 of quench packing column 30 where it passes in direct heat exchange with down coming liquid as shown by arrows 38. The liquid is passed into quench packing column 30 via a plurality of sprays 36 or liquid distributors in a manner well known to those skilled in the art and a top 32 of quench packing column from inlet line 12. The liquid passing through quench packing column 30 is in direct heat exchange contact with the intermediate temperature gas. The gas, after passing through quench packing column 30, is discharged through a line 18 at a temperature which is typically about 20° F. above ambient. This temperature may vary substantially and may be from about 10 to about 50° F. above ambient. The gas stream may be below ambient in some instances and may be passed to further treatment if necessary for the removal of carbon oxides or other materials.

The down coming liquid 40 is collected in a liquid collection zone 43 having a level 42 and withdrawn from liquid collection zone 43 by a line 44 as discussed previously. A pH monitor 56 is connected via a line 54 in fluid communication with the liquid 40 in liquid collection zone 43 to maintain the pH of the intermediate temperature liquid in collection zone 43. This liquid is typically water, although other liquids could be used if desired. The pH is maintained typically in a range from about 6.0 to about 8.0. The pH tends to become increasingly acidic and is adjusted by the addition of an alkaline base material such as sodium bicarbonate, soda ash, sodium hydroxide caustic, or the like. The alkaline material is added in response to signals from pH monitor 56 to a valve 62 via connection shown as a broken line 58 through a treating chemicals line 60, a valve 62 and a line 64. While not shown, a filter may be positioned in the flow path, for instance in line 44, of the liquid to remove particulates which may accumulate in the liquid as it recirculates.

Figure 2:
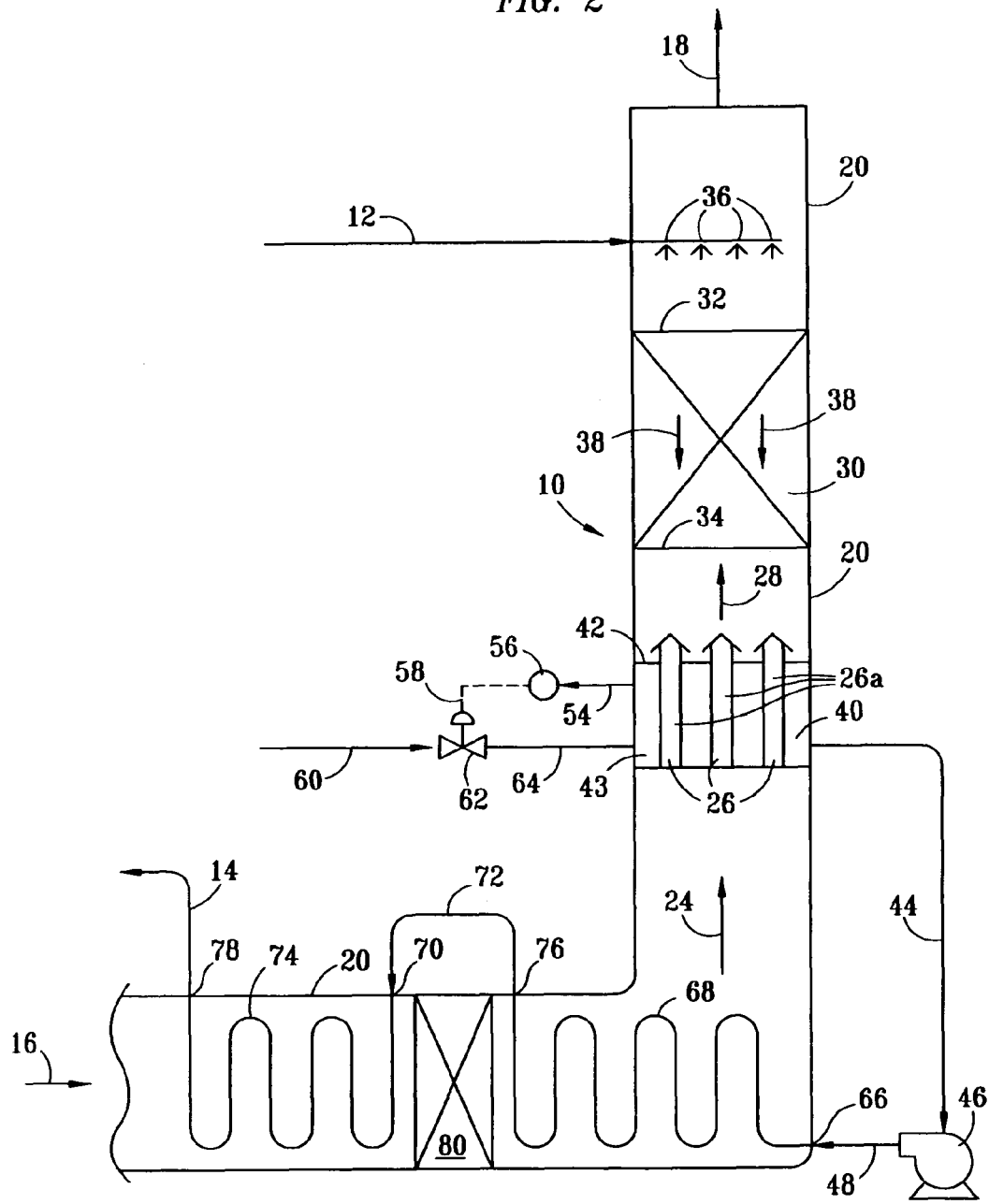
FIG. 2 shows an alternate embodiment of the apparatus of the present invention.
Figure 3:
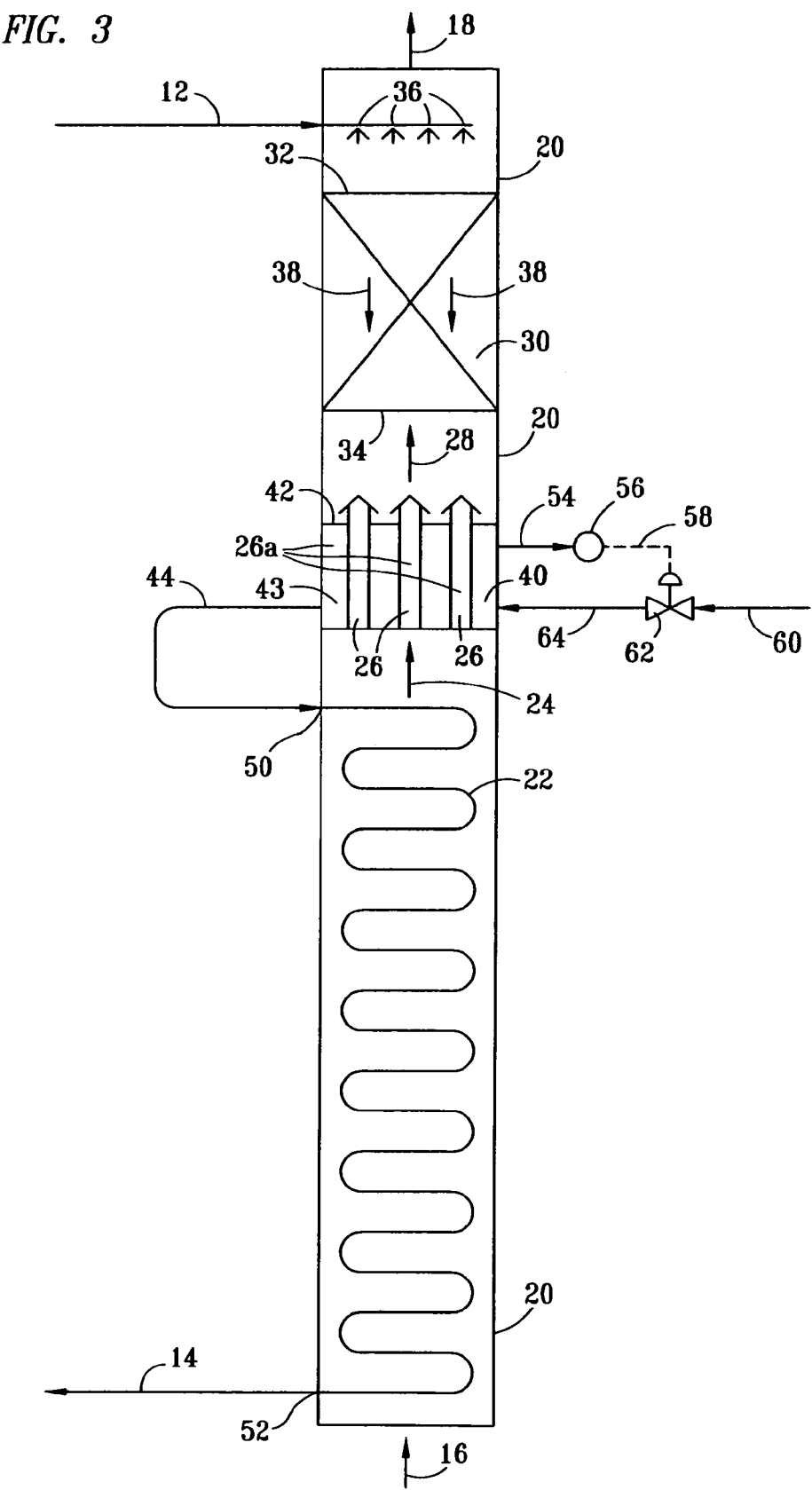
FIG. 3 shows a further embodiment of the present invention.

In FIG. 2, an alternate embodiment of the invention is shown. The invention functions generally as described with respect to FIG. 1 but in this embodiment the gas stream is passed through a heating zone 74, through an outlet 70, through a line 72 and back into a heating zone 68 via an inlet 76 to permit the positioning of an optional selective catalytic reduction unit 80 in vessel 20 as shown. Hot liquid is recovered from an outlet 78 from heat exchanger section 74. Such units are well known to those skilled in the art and are used to reduce the NOx content of gaseous streams.

in FIG. 3, an alternate embodiment of the present invention is shown which is varied only in that the configuration of the vessel has been changed to position the heat exchanger coil 22 in a vertical position rather than in a horizontal position. Such variations are well within the scope of the preset invention. This embodiment may not require a pump in line 44.

Figure 4:
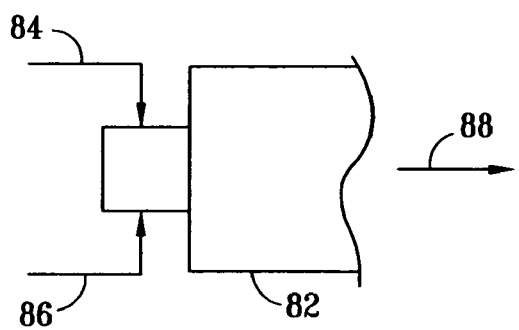
FIG. 4 is a schematic diagram of an in-line heater useful to generate a hot gas for use in apparatus and method of the present invention.

The hot gas stream can be supplied from a variety of sources. One such source is shown in FIG. 4 wherein a fired combustion heater 82 is shown with the combustion heater being fired by a fuel from a line 84 and air from a line 86 to produce a hot exhaust gas 88.

Figure 5:
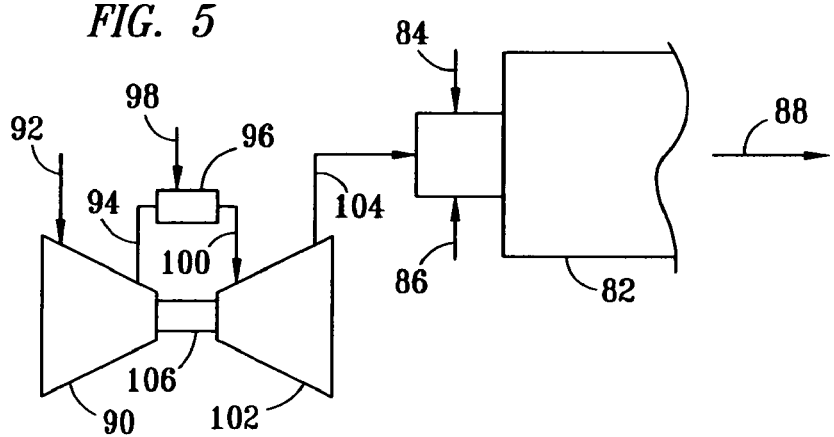
FIG. 5 shows a turbine coupled to a fired heater for the production of hot gas.

Similarly in FIG. 5, a hot gas stream is produced from a turbine system which comprises a compressor 90, fed by an inlet air line 92 to produce a compressed air stream which is discharged via a line 94 to a combustion chamber 96 which supplies hot combustion gas to a turbine 102 via a line 100. Gas is supplied to combustion chamber 96 via a line 98. A hot exhaust gas is produced by turbine 102 and discharged via a line 104 as a hot exhaust gas stream. Typically compressor 90 and turbine 102 are operated on a common shaft 106 so that turbine 102 can drive compressor 90. Such embodiments are typical but other embodiments can be used as desired and are effective to produce a stream of hot exhaust gas. The stream of hot exhaust gas in line 104 is passed to a fired combustion heater 82 fueled by fuel from a line 84 and air from a line 86 to produce a higher temperature in the exhaust gas 88 than the gas temperature as recovered from turbine 102.

Figure 6:
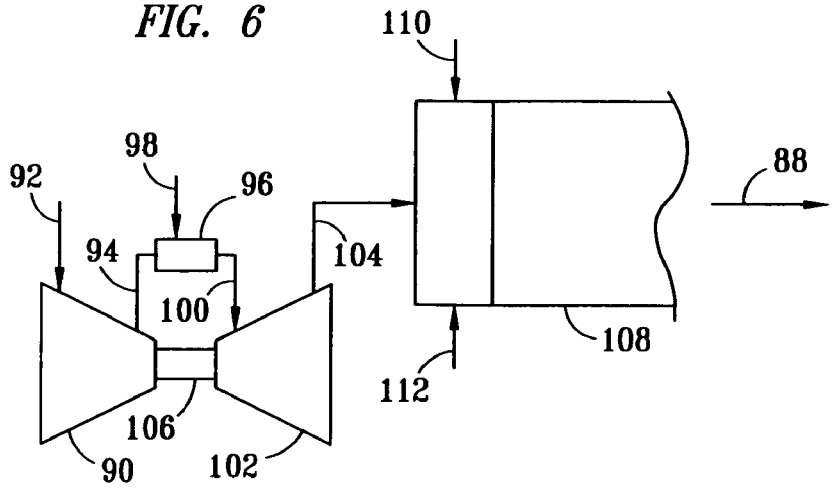
FIG. 6 shows a turbine with a supplemental duct heater.

In FIG. 6 an alternate embodiment is shown wherein a duct burner 108 is shown fueled by a fuel line 110 and an air line 112 to produce a hot exhaust gas stream 88.

In the practice of the method of the present invention, the liquid stream recovered as a cool liquid stream from the recirculating loop is first contacted with an intermediate temperature gas which is typically at a temperature from about 250 to about 350° F. as it enters quench column 30. In quench column 30 by direct heat exchange with the liquid, efficient heat transfer is accomplished and the gas stream is cooled to a temperature as indicated to from about 10 to about 50° F. above ambient temperature. The intermediate temperature liquid 40 recovered in collection zone 43 is typically at a temperature from about 100 to about 150° F. as withdrawn and passed via line 44 to heat exchanger 22. The hot liquid produced through line 14 is typically at a temperature from about 270 to about 300° F. The exhaust gas passed to the heat exchanger through line 16 is typically at a temperature from about 1000 to about 2200° F.

The quench column may be packed with any suitable packing material to facilitate intimate liquid contact with the rising intermediate temperature gas. Any suitable packing can be used in this column, as known to those skilled in the art. Some suitable materials are random packing (saddles, pall rings), structure packing, or the like. In some cases, the quench column internals can be designed with no structure to facilitate surface contact directly with the exhaust gas.

Very efficient heat exchange is accomplished in this quench column. To further heat the liquid, it is passed through a heat exchanger in indirect contact with the hot gas charged to the heat exchanger. As indicated previously, the hot gas may be an exhaust gas from a unit which produces a hot exhaust gas stream.

In the quench column the contact is referred to as gas-to-liquid contact and is very efficient for heat transfer. However, there are certain temperature limitations on this heat exchange operation because of the volatility of the heated fluid, which is typically water. The liquid is most readily heated to temperatures up to about 150° F. by direct heat exchange. Heating beyond these temperatures by gas-to-liquid contact will result in excessive loss of liquid by evaporation. Higher temperatures require the use of indirect heat exchange where the liquid is heated in a closed system heat exchanger to reach its desired outlet temperature. Typically such heat exchangers may be coiled tube exchangers, shell and tube heat exchangers and the like. By combining the use of a quench column heater with the indirect heater, a high temperature is readily achieved in the outlet liquid stream while preserving the efficiency of the contacting in the quench column.

Further while a recirculating loop has not been shown, it will be understood that the liquid recovered through line 14 may be passed to a heat exchange zone and retrieved via a line 12 after it has been cooled. Alternatively the liquid passed through line 12 may be from a different source and the liquid recovered through line 14 may be used for heating purposes without return to the quench column heater. Such variations are well within the scope of the present invention.

Figure 7:
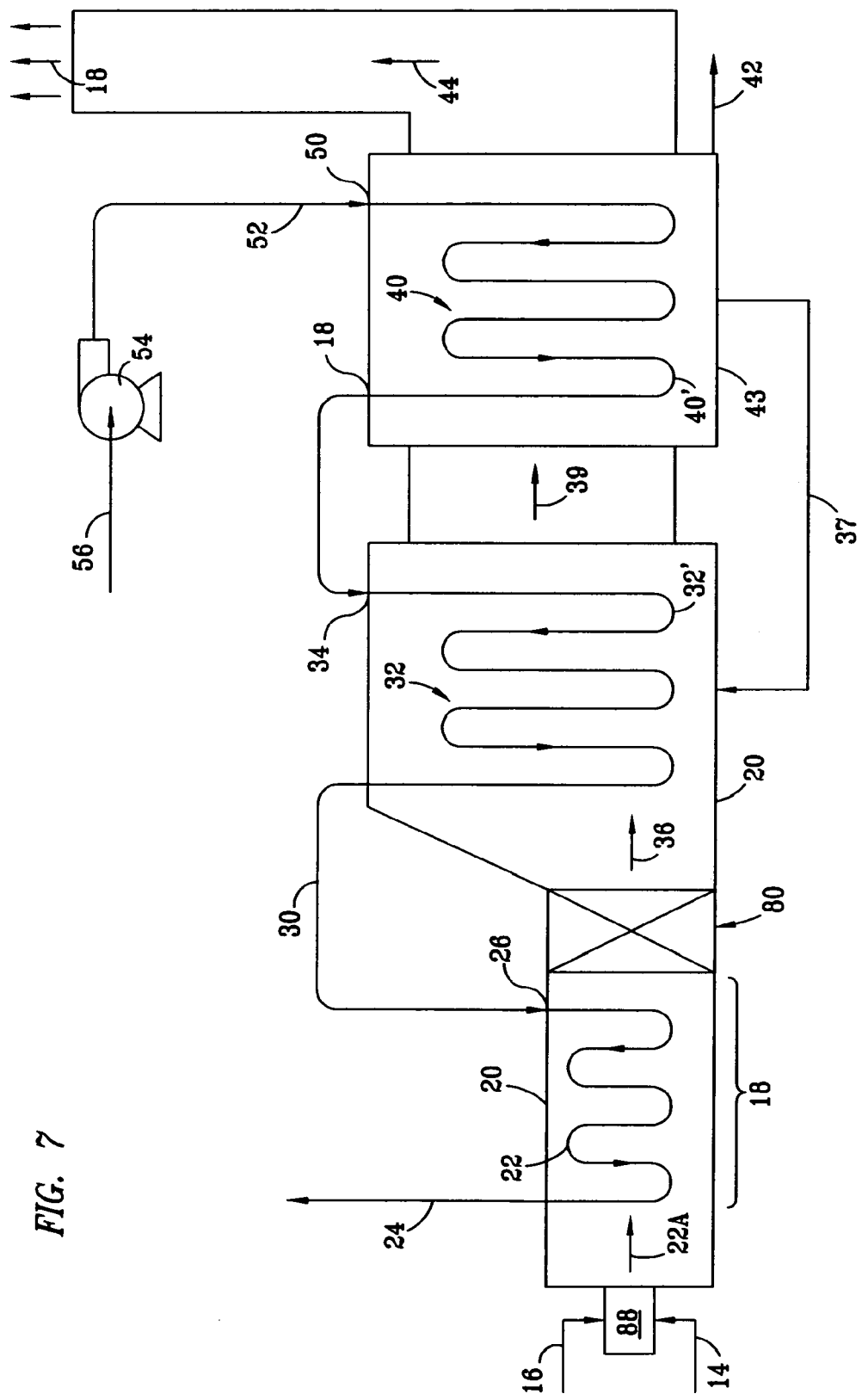
FIG. 7 is a schematic diagram of an alternate embodiment which does not include a quench column.

In a further embodiment of the present invention, which does not include a quenching step, hot gas can be produced from an apparatus as shown in FIG. 7. In the apparatus shown, an enclosure 20 is shown which receives an exhaust stream from a fired heater 88 which is fueled by a light hydrocarbon gas line 16 and an oxygen containing gas line 14. The gases produced from the fired heater are shown passing into enclosure 20 via a tubular coil 22 as indicated by arrow 22A through a first heat exchange section 18 which is shown as comprising tubular coil 22 in contact with combustion gases from fired heater 12 which is a radiant convection heat transfer. The tubular coil 22 may be exposed to radiant heat from heater 88 or may exchange heat with only the hot gas.

In either event, a hot liquid stream is produced and recovered through an outlet into a line 24 for use as a heat exchange hot liquid. The gas stream passing through enclosure 20 and heat exchange tubular coil 22 is passed through a selective nitrogen oxide (NOx) catalyst reduction unit 88. Such units are well known to the art and may be of any suitable type. The liquid stream charged to heat exchange tubular coil 22 is supplied via a heated water inlet 26 which is supplied through a line 30 from a second heat exchange section 32 which comprises a tubular coil 32'. The exhaust gas stream from heat exchange trubular coil 22 initially contains quantities of nitrogen oxides which are reduced in selected NOx catalyst reduction unit 80. The exhaust gas flows as shown by arrow 36 to second section 32 and tubular coil 32' to further cool the exhaust gas. A liquid stream is passed into tubular coil 32' via an inlet 34 and comprises warm liquid, from a warm liquid outlet 48 from a tubular coil 40' in a third section 40.

Waste heat recovery section 40 may comprise a separate enclosure 43 connected to first enclosure 10 by a passageway 37. Alternatively enclosures 10 and 43 may be constructed as a single enclosure. In a tube 40', a cold or cool water is introduced through an inlet 50 fed by a line 52 from a pump 54 which receives a cold water stream from a line 56. The cooled gas then passes as shown by an arrow 44 and is discharged through a stack as shown by arrows 18. The exhaust gas stream may be further treated if desired to remove other components and the like.

By the use of the apparatus shown in FIG. 7, a hot liquid stream is produced from a cold liquid stream while cooling and treating a NOx containing hot exhaust stream to produce a cooled, reduced NOx content gas stream and the hot liquid stream.

Typically the liquid stream is water and the water may be used for a variety of purposes, such as the re-gasification of liquid natural gas (LNG). As discussed previously, the use of this stream to vaporize LNG meets a real need in many instances. For instance, heated exhaust gas may be generated by turbines or the like which may be used to drive unloading equipment or other equipment in the area.

The apparatus of FIG. 7 does not require a quench zone and thus does not require maintaining water at a particular pH and the like. Further it does not require the use of make-up water for evaporation. While make-up water may be added to cover process losses, the addition of water will be minimal. The maintenance of a closed circuit of water is much more readily accomplished than is the use of a quenching system.

According to the method of the present invention, the exhaust gas moves in the direction shown by arrows 22A, 36, 38, 44 and 18 to discharge as a low temperature exhaust gas, typically about 50° F. above ambient temperature at a temperature from about 100° F. to about 180° F. The water moves in a countercurrent fashion so that a cold water stream is heated to produce a hot water stream.

In the practice of the present invention, a cold liquid at a temperature from about 70° F. to about 120° F. is passed via a cold water inlet 50 into tubular coil 40' to produce a warmed liquid stream which is recovered from line 48 at a temperature from about 80° F. to about 130° F., which is then passed to tubular coil 32' in second section 32 where the liquid is heated to produce a warm liquid stream which is passed through a line 30 to an inlet 26 to tubular coil 22 in first section 18 where it is heated to produce a liquid stream at a temperature from about 180 to about 260° F. The exhaust gas is typically discharged from the fired gas heater 88 at a temperature from about 1800 to about 2500° F. and is passed through first section 18 which is designed to reduce the temperature of the gas to a temperature from about 750 to about 550° F. which is suitable for use in the selective NOx catalyst reduction unit.

The flow of gas from fired heater 88 and the flow of liquid through first section 18 are regulated to produce a gas temperature in the exhaust gas stream containing NOx compounds suitable for passage to selective NOx catalyst reduction unit from about 750 to about 550° F. The treated gas having a reduced NOx content is then passed to heat exchange contact in coil 32' where the temperature of the gas is reduced to about 350 to about 240° F. with the cooled gas then passing as shown by arrow 38 into heat exchange contact with coiled tubing reactor 40 where its temperature is reduced further to a value from about 180 to about 100° F.

While the invention has been shown by the use of coiled tubing heat exchangers, it will be understood that shell and tube or other types of heat exchangers could be also be used.

Normally the liquid is water and is heated to a temperature from about 100 to about 200° F. and when used to heat materials such as LNG or other applications, it is typically returned to the process through line 52 at a temperature near or below the dew point temperature of the cooled exhaust gas and typically from about 60 to about 120° F. At these temperatures water may be condensed from the gas stream and may be recovered via a line 42. Wide variations are possible in these temperatures but it is necessary that the temperature of the exhaust gas stream flowing through selective NOx catalyst reduction unit 80 be regulated to a temperature within a range suitable for effective NOx reduction in the reduction unit, i.e., from about 750 to about 550° F.

As indicated previously, such liquid streams are readily used in circulating liquid loops to deliver heat to a desired operation. The revaporization of LNG is one operation which is readily accomplished using the hot liquid stream. The hot liquid stream can be used in shell and tube heat exchangers, coiled tube heat exchangers, air vaporization heat exchangers and the like to revaporize LNG. Of course, the hot liquid can also or alternatively be used to deliver heat for other processing requirements. While the invention has been discussed with reference to liquid generally the most frequently used and preferred liquid will be water.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A heater having a liquid inlet, a hot liquid outlet, a hot gas inlet and a cooled gas outlet and adapted to heat a liquid stream by heat exchange with a hot gas stream to produce a hot liquid stream and a cooled gas stream; the heater consisting essentially of:
   a) a radiant/convection heat transfer first section, a first section liquid inlet, a first section liquid outlet, a first section gas inlet and a first section gas outlet adapted to cool a hot gas stream by heat exchange with a liquid stream to a temperature to produce a hot liquid stream at the first section liquid outlet and a reduced temperature gas stream at the first section gas outlet at a temperature suitable for passage through a selective catalytic reduction unit;
   b) a selective catalytic reduction unit having a reduction unit inlet in fluid communication with the first section gas outlet adapted to pass the reduced temperature gas stream to a reduction unit gas outlet where the selective catalytic reduction unit is operated at a suitable temperature range from about 750 to about 550° F.;
   c) a convection heat transfer section adapted to cool a hot gas by heat exchange with a liquid having a second section liquid inlet, a second section liquid outlet in fluid communication with the first section liquid inlet, a second section gas inlet in fluid communication with the reduction unit gas outlet; and,
   d) a waste heat recovery section having a waste heat recovery section liquid inlet, a waste heat recovery section liquid outlet in fluid communication with the second section liquid inlet, a waste heat recovery section gas inlet in fluid communication with the second section gas outlet and a waste heat recovery section gas outlet.

2. The heater of claim 1 wherein the catalytic reduction unit is a nitrogen oxide reduction unit.

3. The heater of claim 1 wherein the hot gas stream is supplied by a fired heater.

4. The heater of claim 1 wherein the hot gas stream is an exhaust stream from a light hydrocarbon fueled turbine.

5. The heater of claim 1 wherein the liquid is water.

6. A method for producing a hot liquid stream and a cool reduced nitrogen oxide content gas stream from a hot nitrogen oxide-containing gas stream and a cool liquid stream, the method consisting essentially of:
   a) passing the hot nitrogen oxide-containing stream in heat exchange contact with a heated liquid stream to produce the hot liquid stream and a reduced temperature nitrogen oxide-containing gas at a temperature suitable for treatment in a selective nitrogen oxide catalytic reduction unit;
   b) passing the reduced temperature nitrogen oxide-containing gas through the selective nitrogen oxide catalytic reduction unit to produce a reduced nitrogen oxide-containing reduced temperature gas stream;
   c) passing the reduced nitrogen oxide containing reduced temperature gas in heat exchange contact with a warm liquid stream to produce the heated liquid stream and a further reduced temperature reduced nitrogen oxide gas; and,
   d) passing the further reduced temperature reduced nitrogen oxide gas in heat exchange with a cool liquid stream to produce the warm liquid stream and the cool reduced nitrogen oxide-containing stream.

7. The method of claim 6 wherein the liquid streams are water.

8. The method of claim 6 wherein the hot nitrogen oxide containing gas stream is an exhaust gas stream from a fired heater.

9. The method of claim 6 wherein the temperature of the hot nitrogen oxide-containing gas is from about 1000 to about 2500° F.

10. The method of claim 6 wherein the temperature of the reduced temperature nitrogen oxide-containing gas is from about 350 to about 240° F.

11. The method of claim 6 wherein the temperature of the cool reduced nitrogen oxide stream is from about 80 to about 50° F. above ambient temperature.

12. The method of claim 6 wherein the cool liquid stream is from about 70 to about 120° F.

13. The method of claim 6 wherein the temperature of the hot liquid stream is from about 180 to about 300° F.

* * * * *